United States Patent [19]

Hager et al.

[11] Patent Number: 5,798,429
[45] Date of Patent: Aug. 25, 1998

[54] COMPOSITION FOR THE WATER- AND OIL-REPELLENT TREATMENT OF ABSORBENT MATERIALS

[75] Inventors: Rudolf Hager, Altötting; Günther Kolleritsch, Zangberg; Wolfgang Knaup, Burgkirchen, all of Germany

[73] Assignee: Wacker-Chemie GmbH, Munich, Germany

[21] Appl. No.: 782,873

[22] Filed: Jan. 14, 1997

[30] Foreign Application Priority Data

Mar. 14, 1996 [DE] Germany .................. 196 10 111.5

[51] Int. Cl.$^6$ .................................................. C08G 77/24
[52] U.S. Cl. ........................ 528/42; 427/387; 528/33; 528/34
[58] Field of Search .................. 528/42, 33, 34; 427/387

[56] References Cited

U.S. PATENT DOCUMENTS 4,125,673 11/1978 Roth et al. .
4,766,234 8/1988 Wehowsky et al. .
4,873,306 10/1989 Wehowsky et al. .
5,371,155 12/1994 Kobayashi .................. 528/42

FOREIGN PATENT DOCUMENTS 0477805 4/1992 European Pat. Off. .
0552874 7/1993 European Pat. Off. .
0561708 9/1993 European Pat. Off. .

OTHER PUBLICATIONS

Derwent Abstract Corresponding to EP 467083.
Derwent Abstract Corresponding to EP 688 842.

*Primary Examiner*—Melvyn I. Marquis
*Attorney, Agent, or Firm*—Brooks & Kushman

[57] ABSTRACT

The compositions of the present invention comprise the components (A) organosilicon compounds having hydrocarbon radicals, hydroxyl radicals and/or alkoxy radicals and (B) fluorinated organic siloxane compounds containing at least one organic radical having a fluoroalkyl radical comprising 4 to 20 carbon atoms, where the carbon atoms of the fluoroalkyl radicals are saturated with at least 90 mole % of fluorine atoms. The compositions are used to render absorbent building materials oil and water-repellent

11 Claims, No Drawings

COMPOSITION FOR THE WATER- AND OIL-REPELLENT TREATMENT OF ABSORBENT MATERIALS

BACKGROUND OF THE INVENTION

Organosilicon compounds containing alkoxy groups have long been used for the water-repellent impregnation of mineral building materials.

Fluorinated organic compounds are known for their oil-repellent properties. They do additionally possess water-repellent properties, but these are less pronounced and less durable in the long term than those of the organosilicon compounds customarily used for waterproofing building materials.

For this reason, it is advantageous to combine both classes of substances. U.S. Pat. No. 4,125,673 describes a process for making building materials oil-and water-repellent using such combination products comprising organosilicon and fluorinated organic compounds. However, in these compositions, a problem which impairs the overall properties of the products is that the fluorinated, oil-repellent component reduces the penetration and thus the long-term effectiveness of the organosilicon compound, while the organosilicon component acts counter to optimum film formation of the oil-repellent component.

Three-dimensional networks comprising covalently linked organosilanes and organic compounds containing fluorine groups and their use for the water- and oil-repellent treatment of building materials are known from EP-A-561 708. The use of urethanes containing perfluoroalkyl radicals and polysiloxane units for making textiles hydrophobic and oleophobic is described in U.S. Pat. No. 4,873,306. EP-A477 805 describes a combination of silanes containing fluoroalkyl groups with fluorinated olefin telomers which is used for the oil- and water-repellent treatment of non-absorbent, smooth surfaces.

The above fluorine- and silicon- containing organic compounds are not both water-repellent and oil-repellent

BRIEF SUMMARY OF THE INVENTION

The present invention relates to compositions comprising organosilicon compounds and fluorinated organic siloxane compounds for the water-and oil-repellent treatment of absorbent materials, and a process for the water- and oil-repellent treatment of such materials.

DETAILED DESCRIPTION OF THE INVENTION

It is an object of the present invention to provide effective compositions for the water- and oil-repellent treatment of absorbent materials, in particular absorbent mineral building materials or wood.

The present invention provides compositions, comprising,
(A) an organosilicon comprising units of the formula

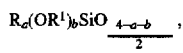  (I)

where

R is an identical or different monovalent SiC-bonded hydrocarbon radical having from 1 to 20 carbon atoms, $R^1$ is an hydrogen atom or identical or different alkyl radical having from 1 to 6 carbon atoms, a is 0, 1, 2 or 3 and b is 1, 2, 3 or 4, with the proviso that the sum of a and b is less than or equal to 4, and (B) a fluorinated organic siloxane comprising at least one unit of the formula

  (IIa)

at least 5 units of the formula

  (IIb)

and, optionally, units of the formula

  (IIc)

where $R^2$ is a radical R,

E is an organic radical having at least one fluoroalkyl radical comprising from 4 to 20 carbon atoms, which organic radical has, in addition to the fluoroalkyl radicals, 3 to 200 atoms which are selected from the group consisting of the elements carbon, hydrogen, oxygen, nitrogen and chlorine, where the carbon atoms of the fluoroalkyl radicals are saturated with at least 90 mole% fluorine atoms, $E^1$ is a radical E or an organic radical having from 3 to 200 atoms which are selected from the group consisting of the elements carbon, hydrogen, oxygen, nitrogen and chlorine, x and y are each 0, 1 or 2 and z is 0, 1, 2 or 3.

For absorbent materials, the water-repellent action of the compositions of the invention comprising components (A) and (B) is undiminished in comparison with the pure organosilicon compounds (A). The oil-repellent action of the pure fluorinated organic siloxane compounds (B) is exceeded by a synergistic effect of the compositions of the invention comprising the components (A) and (B). Accordingly, component (A) improves not only the water-repellent action, but also the oil-repellent action of the fluorinated organic siloxane compounds (B).

The organosilicon compounds (A) can be silanes. In that case, the sum of a and b is 4. If the sum of a and b is less than 4, the organosilicon compounds (A) are oligomeric siloxanes or polymeric siloxanes.

Examples of the radicals R are $C_1$–$C_2$-alkyl radicals such as the methyl, ethyl, n-propyl, iso-propyl, n-butyl, iso-butyl, tert-butyl, n-pentyl, iso-pentyl, neo-pentyl and tert-pentyl radicals; hexyl radicals such as the n-hexyl radical; heptyl radicals such as the n-heptyl radical; octyl radicals such as the n-octyl radical and iso-octyl radicals such as the 2,2,4-trimethylpentyl radical; nonyl radicals such as the n-nonyl radical; decyl radicals such as the n-decyl radical and dodecyl radicals such as the n-dodecyl radical; cycloalkyl radicals such as the cyclopentyl, cyclohexyl, 4-ethylcyclohexyl and cycloheptyl radicals, norbornyl radicals and methylcyclohexyl radicals; alkenyl radicals such as vinyl, allyl, n-5-hexenyl, 4-vinylcyclohexyl and 3-nor-bornenyl radicals; aryl radicals such as the phenyl, biphenylyl, napthyl, anthryl and phenanthryl radicals; alkaryl radicals such as o-, m- and p-tolyl radicals, xylyl radicals and ethylphenyl radicals; aralkyl radicals such as the benzyl radical, the α- and β-phenylethyl radicals. Preference is given to the unsubstituted $C_1$–$C_{12}$-alkyl radicals, more preferably the $C_1$–$C_8$-alkyl radicals and the phenyl radical. Particular preference is given to the methyl radical.

The radical $R^1$ is a hydrogen atom or a hydrocarbon radical having from 1 to 3 carbon atoms; preferably the methyl and ethyl radicals.

Examples of the organosilicon compounds (A) are silanes such as methyltrimethoxysilane and methyltriethoxysilane, n-propyltrimethoxysilane and n-propyltriethoxysilane, iso-butyltrimethoxysilane and isobutyltriethoxysilane, n-octyltrimethoxysilane and n-octyltriethoxysilane and isooctyltrimethoxysilane and iso-octyltriethoxysilane.

Further examples of the organosilicon compounds (A) are (poly)siloxanes such as methylmethoxy(poly)siloxanes, methylethoxy(poly)siloxanes, dimethyl(poly)siloxanes, n-propylmethoxy(poly)siloxanes, n-propylethoxy(poly)-siloxanes, iso-butylmethoxy(poly)siloxanes, iso-butylethoxy(poly)siloxanes, n-octylmethoxy(poly)siloxanes and n-octylethoxy(poly)siloxanes, iso-octylmethoxy(poly) siloxanes and iso-octylethoxy(poly)siloxane, and copolymers of these alkoxy(poly)siloxanes.

Preferred examples of the organosilicon compounds (A) are those which are obtainable by reaction of methyltrichlorosilane and, optionally, a $C_1$–$C_{12}$-alkyltrichlorosilane, or phenyltrichlorosilane, with methanol or ethanol in water, for example the organopolysiloxanes in which a is from 0.8 to 1.2, preferably from 0.9 to 1.1, and b is from 0.6 to 1.5, in particular from 0.7 to 1.4.

The molecular weight and the degree of crosslinking of the organosilicon compounds (A) have upper limits imposed only by the requirement that the compounds remain soluble in organic solvents.

The organosilicon compounds (A) have a viscosity at 25° C. of from 2 mPa·s to 5000 mPa·s, preferably from 5 mPa·s to 500 mPa·s.

The component (A) present in the composition of the invention can be one type of organosilicon compound comprising units of formula (I) or a mixture of a plurality of types of such organosilicon compounds. Component (A) is present in the composition of the invention in amounts of from 50% to 99% by weight, preferably from 70% to 95% by weight, based on the sum of the components (A) and (B).

For the radical $R^2$ present in the fluorinated organic siloxane compounds (B) comprising units of formulae (IIa), (IIb) and (IIc), examples are given above under R.

Preferably, y has the value 2 in at least 95% of the units of formula (IIb).

From 5 to 500, preferably from 10 to 300, units of formula (IIb) are present per unit of formula (IIa) and, at most 10, preferably one, unit(s) of formula (IIc) is/are present per 10 units of formula (IIa).

E is a radical of the formula

X—Y—Z    (III), where

X is a radical of the formula

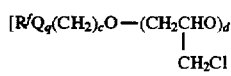
(IV)

where $R^f$ is a perfluoroalkyl radical having from 4 to 20 carbon atoms or a ω-H-perfluoroalkyl radical having from 4 to 20 carbon atoms, Q is a radical of the formulae

—SO$_2$NR$^3$—    (V)

or

—CH$_2$CH$_2$SO$_2$NR$^3$—    (VI), where $R^3$ is a hydrogen atom or an alkyl radical having from 1 to 4 carbon atoms, $R^4$ is an alkyl radical having from 4 to 20 carbon atoms, c is an integer from 1 to 4, d and e are each an integer from 0 to 10, m is 1 or 2, n is 0 or 1, where the sum of m+n is atmost 2, q is 0 or 1 and A is a radical corresponding to one of the formulae (VII) to (XV)

(VII)

(VIII)

(IX)

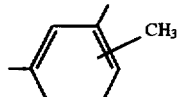
(X)

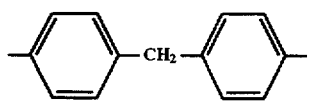
(XI)

—(CH$_2$)$_6$—    (XII)

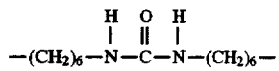
(XIII)

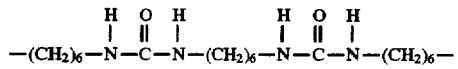
(XIV)

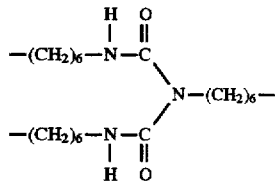
(XV)

Y is an oxygen atom or a radical of the formula

—NR$^5$—    (XVI), where $R^5$ is an alkyl radical having from 1 to 4 carbon atoms, and Z is a radical corresponding to one of the formulae (XVII) to (XX)

$$-(CH_2)_f-, \quad (XVII)$$
$$-(CH_2)_gO(CH_2)_g-, \quad (XVIII)$$
$$-(CH_2)_hNR^5(CH_2)_i-, \quad (XIX)$$

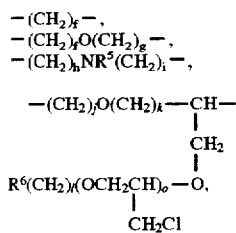

(XX)

where f, g, h, i, j, k, l and o are each an integer from 0 to 10 and $R^6$ is a radical $R^4$ or $R^f$.

$E^1$ is preferably a radical of the formula $$X^1-Y-Z- \quad (XI),$$

where $X^1$ is as defined for X or is a hydrogen atom and

Y and Z are as defined above. The radical $R^f$ has preferably from 6 to 16 carbon atoms. $R^4$ is preferably an alkyl radical having from 10 to 18 carbon atoms. Preferably, c is 1 or 2; d, e, f, g, h, i, j, k, l and o are each 0, 1, 2, 3, 4 or 5.

The component (B) present in the composition of the invention can be one type or a mixture of a plurality of types of fluorinated organic siloxane compounds (B) comprising units of formula (II). Component (B) is present in the composition of the invention in amounts of from 1% to 50% by weight, in particular from 5% to 30% by weight, based on the sum of the components (A) and (B).

In addition to the components (A) and (B), the composition of the invention optionally contains (C) organic solvent. The organic solvents are aromatic or aliphatic hydrocarbons such as toluene, xylenes, petroleum spirit and iso-paraffins, ketones such as acetone, methyl ethyl ketone and diethyl ketone, ethers such as diisopropyl ether, tetrahydrofuran and dibutyl ether, esters such as ethyl acetate and butyl acetate and alcohols such as ethanol and isopropanol. Preference is given to petroleum spirit and isoparaffins and mixtures of these with ketones and/or alcohols and/or esters.

If the composition of the invention contains organic solvents, they are present from 0.1 to 99 parts by weight, preferably from 0.5 to 98 parts by weight, of organic solvent per part by weight of the sum of the components (A) and (B).

In addition to the components (A), (B) and (C), the composition of the invention can contain further components. If, for example, organosilicon compounds of the component (A) contain many alkoxy groups $OR^1$, it can be advantageous to add a condensation catalyst as further component of the composition of the invention. Examples of such condensation catalysts are acids and bases and also organometallic compounds, for example dibutyltin acetate, dibutyltin laurate, butyl titanate and zirconium titanate. The organometallic compounds are preferred.

The amount of catalyst is from 0.001 to 0.1 parts by weight, preferably from 0.005 to 0.03 parts by weight based on one part by weight of the component (A).

The compositions of the invention are prepared by simple mixing of the components (A), (B) and, optionally, further components in any order.

The composition of the invention can also be prepared as an aqueous dispersion. For this purpose, the above described components (A) and (B) and, optionally, further components are dispersed in water using surfactants.

The compositions of the invention are used for the water- and oil-repellent treatment of absorbent mineral building materials or wood. For the purposes of the present invention, absorbent means that the material concerned is able to take up at least 0.1% of its weight of liquid by means of capillary suction. Examples of absorbent materials are mineral building materials such as concrete, clay, bricks, ceramic tiles, fibrocement sheets, lime-sand bricks, sandstone, limestone, marble, travertine, granite and also non-mineral building materials, in particular wood and cellulose-containing materials.

The compositions of the invention can be applied in any way, for example by spraying on, pouring, brushing, rolling or dipping. The process has the advantage that excellent and durable water- and oil-repellent action is achieved very simply and using little material. The process of the invention is notable for the fact that the capillary takeup of water and pollutants dissolved in water and oil and oleophilic substances is reduced or suppressed without the pores and capillaries of the substrate being closed. The substrate thus continues to be able to breathe.

The invention is illustrated by the following examples. All parts and percentages are by weight. The examples are carried out at the pressure of the surrounding atmosphere at about 1000 hPa, and at room temperature at about 23° C. The substrates treated with the compositions of the invention have been stored for at least 28 days under standard conditions of temperature and humidity (23° C./50% relative atmospheric humid ity) before use.

EXAMPLE 1

10 g of a urethane containing perfluoroalkyl radicals and polysiloxane and having the formula $$XOCH_2CH_2CH_2-[(CH_3)_2SiO]_{48.5}-(CH_3)_2Si-CH_2CH_2CH_2O-X$$

$X =$ $$[(C_8F_{17}-C_{16}F_{33})-CH_2CH_2O-(CH_2CHO)_2-CONH]_2-A-NHCO-$$
$$\qquad\qquad\qquad\qquad\qquad\qquad\qquad |$$
$$\qquad\qquad\qquad\qquad\qquad\qquad\qquad CH_2Cl$$

$$A = \begin{array}{c} -(CH_2)_6NHCO \\ \diagdown \\ \diagup \\ -(CH_2)_6NHCO \end{array} N-(CH_2)_6-$$

prepared by the method described in Example 3 of U.S. Pat. No. 4,873,306, are dissolved in a mixture of 10g of isopropanol, 25g of butyl acetate and 895g of a liquid isoparaffin (ISOPARO® from Deutsche Exxon Chemical GmbH, Cologne) and homogeneously mixed with 60g of an oligomeric methylsiloxane having the average formula $MeSi(OEt)_{0.75}O_{1.125}$(viscosity at 25° C.: about 22 mPa·s) and 1.2g of butyl titanate. The colorless to pale yellow clear solution thus obtained is stored with exclusion of moisture.

EXAMPLE 2

Example 1 is repeated except that twice the amount of isoparaffin is used.

EXAMPLE 3

Example 1 is repeated except that a copolymeric methyl/isooctylsiloxane having the average formula $Me_{0.7}{}^i oct_{0.3}Si(OMe)_{1.3}O_{0.85}$ (viscosity at 25° C.: about 15 mPa·s) is used in place of the oligomeric methyl siloxane.

EXAMPLE 4

Example 3 is repeated except that twice the amount of isoparaffin is used.

EXAMPLE 5

About 300 g/m² of the impregnation compositions indicated in Table 1 are applied by brushing to unglazed terracotta plates. After drying for 7 days at room temperature, water- and oil-repellent action are tested. For this purpose, 5 drops of water and 5 drops of soy oil (volume in each case about 0.2 ml) are applied to each plate. To characterize the water-repellent action, the contact angle of the water drops (if they have not yet soaked in) is determined 30 minutes after application. To characterize the oil-repellent action, the drops are wiped off successively (after 1 minute, 1 hour, 8 hours, 24 hours and 72 hours) and the remaining spot is assessed (1=no spot can be seen, 2=light spot, 3=distinct spot, 4=strong spot, 5=oil drop already soaked in before test).

TABLE 1

| Impregnation composition | Water-repellent action (contact angle after 30 minutes) | Oil-repellent action (spot formation) | | | | |
|---|---|---|---|---|---|---|
| | | 1 min | 1 h | 8 h | 24 h | 72 h |
| Example 1 | 140° | 1 | 1 | 1 | 1 | 1 |
| Example 2 | 140° | 1 | 1 | 1 | 1 | 1–2 |
| Example 3 | 140° | 1 | 1 | 1 | 1 | 1–2 |
| Example 4 | 140° | 1 | 1 | 1 | 1–2 | 2 |
| Comparative Experiment a* | soaked in | 4 | 5 | 5 | 5 | 5 |
| Comparative Experiment b* | 110° | 1 | 1 | 1–2 | 2 | 2–3 |
| Comparative Experiment c* | 140° | 1 | 2 | 2–3 | 3 | 3–4 |

*Comparative Experiment a: Untreated terracotta plate
*Comparative Experiment b: Urethane solution from Example 1, but without addition of the organosilicon compound (A)
*Comparative Experiment c: Mixture of 40 g of a solution of a silicone-free fluoropolymer in ethyl acetate and n-heptane (Sotchguard® FX 3530 from 3M Deutschland GmbH, Neuss; 25% active content) with 60 g of the methyl siloxane described in Example 1 and 890 g of the isoparaffin described in Example 1.

Conclusions

Good water- and oil-repellent action are achieved using the compositions of the invention from Examples 1 to 4. The synergy of fluorinated organic siloxane compounds (B) and additional organosilicon compound (A) is confirmed by Comparative Experiment b. Component (A) improves not only the water-repellent action, but also the oil-repellent action. Comparative Experiment c shows that this synergy only occurs in the case of the fluorinated organic siloxane compounds (B) of the compositions of the invention, while the oil-repellent action of other fluorine compounds is in no way improved, but instead may even be made worse, by addition of an organosilicon compound (A).

EXAMPLE 6

Cubes of lime-sand brick having an edge length of 5 cm are immersed for 5 minutes in the impregnation compositions indicated in Table 2 (5 cm of overlying liquid). The uptake of impregnation composition achieved here is about 500 g/m². After drying for 7 days, water- and oil-repellent action are tested as in Example 5. In addition, the capillary water uptake is determined by immersing the test specimens in water (5 cm of overlying water) for 24 hours.

TABLE 2

| Impregnation composition | Water-repellent action | | Oil-repellent action** | | | | |
|---|---|---|---|---|---|---|---|
| | Contact angle after 30 min. | Water uptake after 24 h immersion | 1 min | 1 h | 8 h | 24 h | 72 h |
| Example 1 | 140° | 1.3% | 1 | 1 | 1 | 1–2 | 2 |
| Example 2 | 140° | 2.8% | 1 | 1 | 1 | 2 | 2–3 |
| Example 3 | 140° | 1.2% | 1 | 1 | 1–2 | 2 | 2–3 |
| Example 4 | 140° | 2.6% | 1 | 1 | 1–2 | 2 | 2–3 |
| Comparative Experiment a* | soaked in | 12.5% | 5 | 5 | 5 | 5 | 5 |
| Comparative Experiment b* | <90° | 11.7% | 1 | 2 | 2–3 | 3 | 3–4 |
| Comparative Experiment c* | 140° | 1.5% | 2 | 3 | 4 | 4–5 | 5 |

*Comparative Experiments a, b, c as in Example 5
**Assessment as in Example 5

Conclusions:

Comparative Experiment b demonstrates the water-repellent action of the component (A) even more clearly than Example 5. While the oleophobic component (B) acts only on the surface, the component (A) penetrates deeply and thus forms a hydrophobic zone which is resistant even to water under pressure (5 cm of overlying water). The compositions of the invention from Examples 1 to 4 clearly give a better oil-repellent action than the impregnation compositions in the Comparative Experiments b and c.

EXAMPLE 7

Mortar discs having a diameter of 8 cm and a thickness of 2 cm are produced without use of forming oil from 2700 g of standard sand (from Normensand GmbH, D-59269 Beckum bei Mu nster), 900 g of white cement PZ 450Z (from Dyckerhoff Zementwerke AG, D-65203 Wiesbaden) and 450g of water by employing plastic rings. After conditioning for 4 weeks at 23° C./50% relative atmospheric humidity, three test specimens in each case are impregnated with the impregnation compositions from Examples 1 and 3 by immersion for 1 minute. After drying for 7 days at room temperature, the specimens thus treated together with 3 untreated mortar discs are laid in water for 28 days (5 cm of overlying water) and the mean water uptake (percentage weight increase) is determined. It is found that the untreated test specimens take up about 7.5% of water, those treated with the impregnation composition from Example 1 take up about 5% and those treated with the impregnation composition from Example 3 take up about 3%. The different water-repellent actions of the products from Examples 1 and 3 result from the different composition of their component (A). Long-chain organic radicals on the silicone atom (radicals R in the general formula (I)) give a higher alkali stability. In the case of highly alkaline substrates such as the mortar discs used here or concrete, this structure-action relationship becomes clearly apparent

EXAMPLE 8

About 50 g/m² of impregnation composition from Example 2 are applied by brushing to a granite test specimen. After drying for 7 days, water and soy oil are dripped onto the area thus treated and onto untreated granite (in each case about 0.2 ml per drop). While on the untreated stone the drops spread out within seconds, they remain unaltered for a long time on the impregnated surface (contact angle after 1 hour: water >130°, oil >100°).

What is claimed is:

1. A composition, comprising:

(A) an organosilicon compound comprising units of the formula

 (I)

where

R are identical or different monovalent SiC-bonded hydrocarbon radicals having from 1 to 20 carbon atoms, $R^1$ are hydrogen atoms or identical or different hydrocarbon radicals having from 1 to 6 carbon atoms, a is 0, 1, 2 or 3 and b is 1, 2, 3 or 4, with the proviso that the sum of a and b is less than or equal to 4, and (B) a fluorinated organic siloxane comprising at least one unit of the formula

 (IIa)

at least 5 units of the formula

 (IIb)

per each unit (IIa), and, optionally, units of the formula

 (IIc)

where $R^2$ is a radical R,

E is an organic radical having at least one fluoroalkyl radical comprising from 4 to 20 carbon atoms, which organic radical has, in addition to the fluoroalkyl radicals, a further 3 to 200 atoms which are selected from the group consisting of the elements carbon, hydrogen, oxygen, sulfur, nitrogen and chlorine, where the carbon atoms of the fluoroalkyl radicals are saturated with at least 90 mol % fluorine atoms, $E^1$ is a radical E or an organic radical having from 3 to 200 atoms which are selected from the group consisting of the elements carbon, hydrogen, oxygen, sulfur, nitrogen and chlorine, x and y are each 0, 1 or 2 and z is 0, 1, 2 or 3.

2. A composition as claimed in claim 1, wherein in the component (A) the radicals R are unsubstituted $C_1$-$C_{12}$-alkyl radicals.

3. A composition as claimed in claim 1, wherein in the component (A) the radicals $R^1$ are hydrogen atoms or hydrocarbon radicals having from 1 to 3 carbon atoms.

4. A composition as claimed in claim 1, wherein the organosilicon compounds of the component (A) have a viscosity of from 2 mPa·s to 5000 mPa·s.

5. A composition as claimed in claim 1, wherein the component (A) is present in an amount of from 50% to 99% by weight, based on the sum of the components (A) and (B).

6. A composition as claimed in claim 1, wherein in the component (B) y is 2 in at least 95% of the units of formula (IIb).

7. A composition as claimed in claim 1, wherein in the component (B) from 5 to 500 units of formula (IIb) are present per unit of formula (IIa).

8. A composition as claimed in claim 1, wherein the component (B) is present in an amount of from 1% to 50% by weight, based on the sum of the components (A) and (B).

9. A composition as claimed in claim 1, further comprising (C) an organic solvent.

10. A process for the water- and oil-repellent treatment of absorbent material, which comprises applying a composition as claimed in claim 1, to the absorbent material.

11. A composition, comprising:

(A) an organosilicon compound comprising units of the formula

 (I)

where

R are identical or different monovalent SiC-bonded hydrocarbon radicals having from 1 to 20 carbon atoms, $R^1$ are hydrogen atoms or identical or different hydrocarbon radicals having from 1 to 6 carbon atoms, a is 0, 1, 2 or 3 and b is 1, 2, 3 or 4, with the proviso that the sum of a and b is less than or equal to 4, and (B) a fluorinated organic siloxane comprising at least one unit of the formula

 (IIa)

at least 5 units of the formula

 (IIb)

per each unit (IIa), and, optionally, units of the formula

 (IIc)

where

R2 is a radical R,

E is an organic radical having at least one fluoroalkyl radical comprising from 4 to 20 carbon atoms, which organic radical has, in addition to the fluoroalkyl radicals, a further 3 to 200 atoms which are selected from the group consisting of the elements carbon, hydrogen, oxygen, sulfur, nitrogen and chlorine, where the carbon atoms of the fluoroalkyl radicals are saturated with at least 90 mol % fluorine atoms, $E^1$ is a radical E or an organic radical having from 3 to 200 atoms which are selected from the group consisting of the elements carbon, hydrogen, oxygen, sulfur, nitrogen and chlorine, x and y are each 0, 1 or 2 and z is 0, 1, 2 or 3, wherein at least one of E or $E^1$ comprises a radical of the formula

 (III), where

X is a radical of the formula

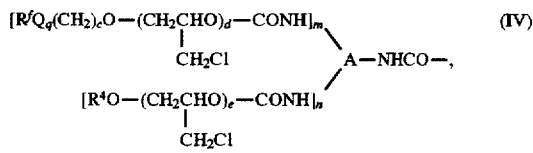 (IV)

where $R^f$ is a perfluoroalkyl radical having from 4 to 20 carbon atoms or a ω-H-perfluoroalkyl radical having from 4 to 20 carbon atoms, Q is a radical of the formulae

 (V), or

 (VI), where $R^3$ is a hydrogen atom or an alkyl radical having from 1 to 4 carbon atoms, $R^4$ is an alkyl radical having from 4 to 20 carbon atoms, c is an integer from 1 to 4, d and e are each an integer from 0 to 10, m is 1 or 2, n is 0 or 1, where the sum of m+n is at most 2, q is 0 or 1 and A is a radical corresponding to one of the formulae (VII) to (XV)

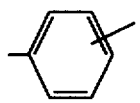 (VII)

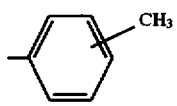 (VIII)

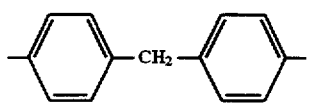 (IX)

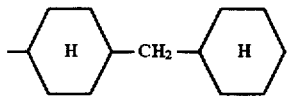 (X)

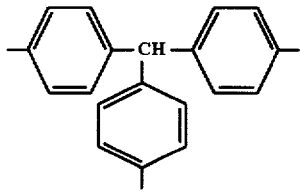 (XI)

 (XII)

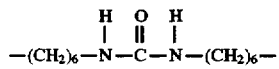 (XIII)

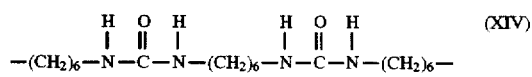 (XIV)

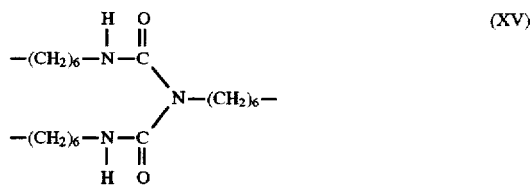 (XV)

Y is an oxygen atom or a radical of the formula

 (XVI), where $R^5$ is an alkyl radical having from 1 to 4 carbon atoms, and Z is a radical corresponding to one of the formulae (XVII) to (XX)

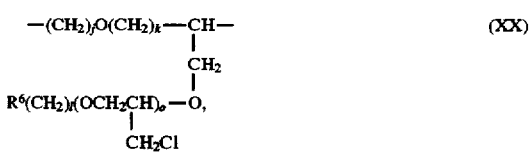 (XX)

where f,g,h,i,j,k,l and o are each an integer from 0 to 10 and $R^6$ is a radical $R^4$ or $R^f$ $E^1$ is a radical of the formula

 (XI), where $X^1$ is as defined for X or is a hydrogen atom and

Y and Z are as defined above $R^f$ has from 6 to 16 carbon atoms $R^4$ is an alkyl radical having from 10 to 18 carbon atoms, and c is 1 or 2; d,e,f,g,h,i,j,k,l and o are each 0,1,2,3,4 or 5.

* * * * *